(12) United States Patent
Qin et al.

(10) Patent No.: US 7,471,668 B2
(45) Date of Patent: Dec. 30, 2008

(54) METHOD AND APPARATUS FOR IMPLEMENTING ALL-TO-ALL COMMUNICATION IN A WIRELESS MESH NETWORK

(75) Inventors: Xiangping Qin, Santa Clara, CA (US); Mousumi Hazra, Beaverton, OR (US); Mustafa Demirhan, Hillsboro, OR (US); Mark D Yarvis, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 849 days.

(21) Appl. No.: 10/930,515

(22) Filed: Aug. 31, 2004

(65) Prior Publication Data

US 2006/0045064 A1    Mar. 2, 2006

(51) Int. Cl.
*H04L 12/28* (2006.01)
(52) U.S. Cl. ........................ 370/351; 370/406
(58) Field of Classification Search ............. None
See application file for complete search history.

(56) References Cited

U.S. PATENT DOCUMENTS

| 7,310,335 | B1* | 12/2007 | Garcia-Luna-Aceves et al. | 370/390 |
| 2001/0034793 | A1* | 10/2001 | Madruga et al. | 709/238 |
| 2004/0090943 | A1* | 5/2004 | da Costa et al. | 370/338 |
| 2004/0125776 | A1* | 7/2004 | Haugli et al. | 370/338 |

FOREIGN PATENT DOCUMENTS

| EP | 1244249 A2 | 9/2002 |
| WO | WO-02084956 A1 | 10/2002 |

* cited by examiner

*Primary Examiner*—Wing F Chan
*Assistant Examiner*—Anthony Sol
(74) *Attorney, Agent, or Firm*—The Law Offices of John C. Scott, LLC; John C. Scott

(57) ABSTRACT

All-to-all communication is carried out in a wireless mesh network using a relaying packet that is routed through the network. In at least one embodiment, the relaying packet includes aggregated information that is made available to all nodes in the mesh network.

20 Claims, 5 Drawing Sheets ated to herein as a "relaying packet." METHOD AND APPARATUS FOR IMPLEMENTING ALL-TO-ALL COMMUNICATION IN A WIRELESS MESH NETWORK

TECHNICAL FIELD

The invention relates generally to wireless communications and, more particularly, to communication techniques for use in wireless mesh networks.

BACKGROUND OF THE INVENTION

A wireless mesh network is a network that is made up of wireless nodes that may act as both independent communication devices and as routing devices. That is, a node can transmit and receive information for itself and also pass on information in an appropriate direction for other nodes. Each node in a wireless mesh network may support a direct wireless link with some or all of the other nodes in the network. In a wireless mesh network, functions may exist that require all of the nodes in the network to share information with all of the other nodes in the network. This is known as all-to-all communication. In some mesh networks of the past, all-to-all communication was implemented by allowing each of the nodes in the network to independently transmit information to, or receive information from, all of the other nodes in the network. Such techniques are inefficient because, among other things, they typically require a large number of data transmissions to be performed for routing purposes. There is a general need for techniques and structures for efficiently implementing all-to-all communication in a mesh network.

DETAILED DESCRIPTION

Figure 1:
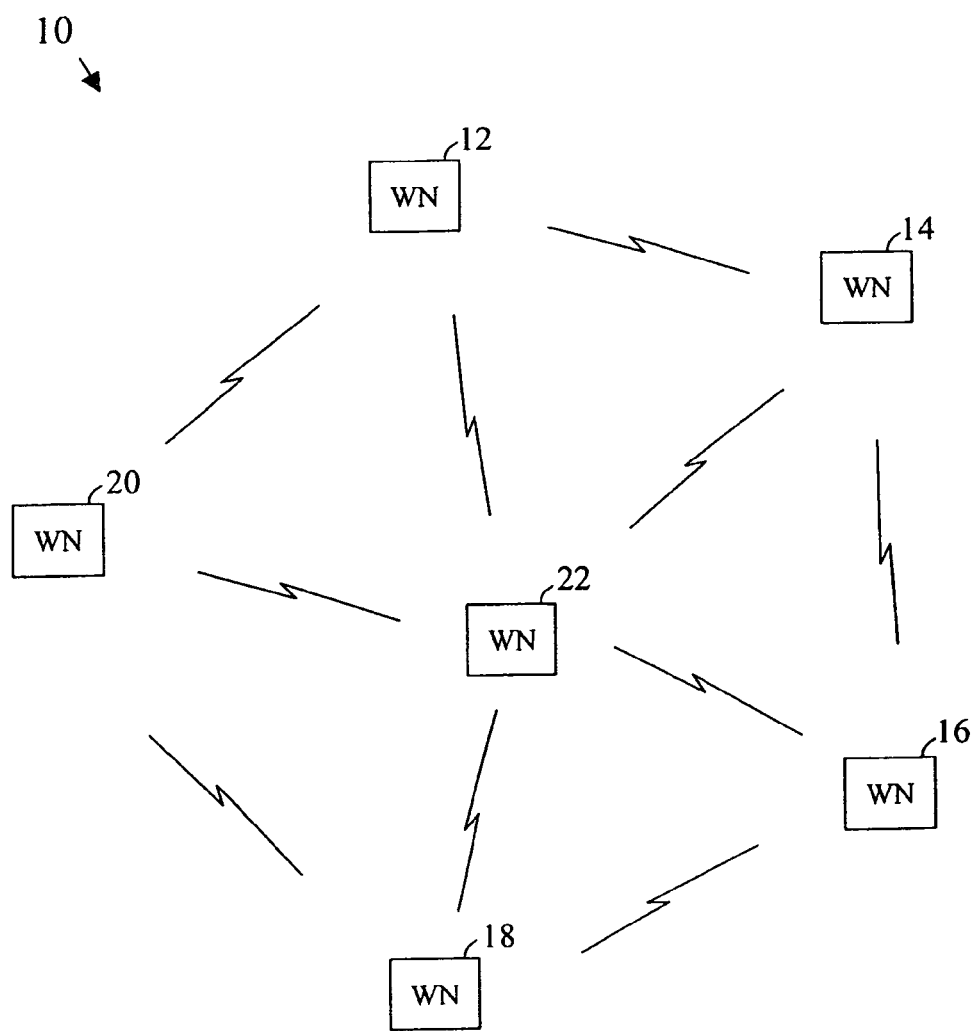
FIG. 1 is a block diagram illustrating an example wireless mesh network that may implement features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless mesh network 10 that may implement features of the present invention. As illustrated, the mesh network 10 includes a plurality of wireless nodes 12, 14, 16, 18, 20, 22 that are capable of communicating with one another through either a direct wireless link or a series of node to node links. For example, node 18 can communicate wirelessly with node 16 by a direct wireless link between the nodes 16, 18. Node 20 can also communicate with node 16, but multiple node-to-node links must be used (e.g., a link from node 20 to node 22 and another link from node 22 to node 16, a link from node 20 to node 18 and another link from node 18 to node 16, etc.). The nodes within direct wireless communication range of a first node may be referred to as the "neighbor nodes" of the first node. Thus, with reference to FIG. 1, nodes 16, 20, and 22 are neighbor nodes of node 18, and so on. The neighbor nodes of a particular node may be tracked by sensing and analyzing beacon signals transmitted by the other nodes.

In at least one embodiment of the present invention, a wireless mesh network is created amongst the wireless access points of a wireless network, thus allowing the wireless access points to communicate with one another wirelessly. One or more of the wireless access points may also be connected to the Internet, the public switched telephone network (PSTN), and/or some other external network. Each of the wireless access points may also service one or more wireless clients within a coverage region thereof. In one possible approach, the client devices associated with a wireless access point may also be capable of communicating with one another as a mesh network. As will be appreciated, many other mesh network arrangements may alternatively be used.

In a wireless mesh network, one or more functions in the network may require that each of the nodes in the network communicate information to all of the other nodes in the network. For example, with reference to FIG. 1, node 12 may have to communicate certain information to nodes 14, 16, 18, 20, and 22; node 14 may have to communicate certain information to nodes 12, 16, 18, 20, and 22; and so on. This will be referred to herein as "all-to-all communication." All-to-all communication may be used within a wireless mesh network to, for example, support self-configuration functions. This type of information may include, for example, node location information, ambient noise information, channel usage information, received signal strength, transmit power, traffic characteristics, and/or other types of information. In at least one application, for example, all-to-all communication is used to support channel selection functions within a wireless mesh network. That is, each of the nodes in the network may transfer information to the other nodes that relates to the achievable throughput in each of a plurality of available frequency bands in the network This information may later be used within the network to make channel adaptation decisions when necessary.

In at least one aspect of the present invention, all-to-all communication is achieved in a wireless mesh network by causing a single packet to flow through the mesh network from node to node while aggregating the required information from each node during travel. This packet will be referred to herein as the "relaying" packet. Each node that receives the relaying packet can read and store the aggregated information for use in performing one or more corresponding functions (e.g., channel selection, etc.). The receiving node may also update any information within the relaying packet that corresponds to the node, if needed. The receiving node may then transfer the relaying packet to another node in the mesh network where the above-described process can be repeated.

Figure 2:
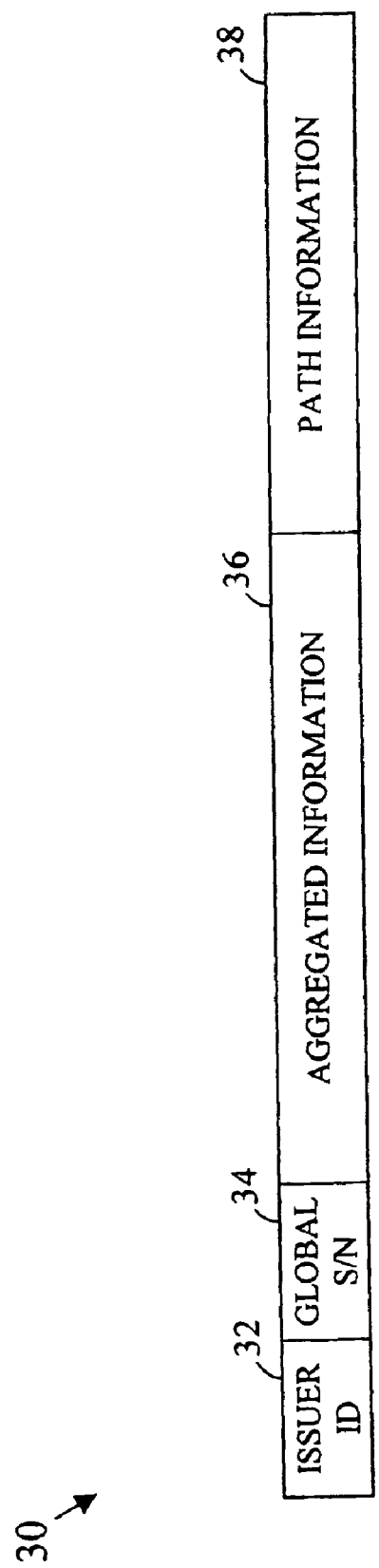
FIG. 2 is a diagram illustrating the content of an example relaying packet in accordance with an embodiment of the present invention.

FIG. 2 is a diagram illustrating the content of an example relaying packet 30 in accordance with an embodiment of the present invention. As illustrated, the relaying packet 30 may include: an issuer identifier 32, a global serial number 34, aggregated information 36, and path information 38. The issuer identifier 32 identifies the node within the mesh network that originally issued the relaying packet 30 and the global serial number 34 identifies the relaying packet 30 itself. As will be described in greater detail, the issuer identifier 32 and the global serial number 34 may be used to prevent or terminate a condition where multiple relaying packets are circulating within a mesh network at the same time. The aggregated information 36 is the information collected from each of the visited nodes for delivery to the other nodes in the network. The first time a particular node receives the relaying packet 30, the node may enter appropriate information into the aggregated information portion 36 of the packet. Thereafter, each time the node receives the relaying packet 30, the node may update the aggregated information 36, if needed. As discussed previously, the content of the aggregated information portion 36 will be application specific.

As the relaying packet 30 travels around the mesh network, an identifier is recorded within the packet 30 for each node that the relaying packet 30 visits, in time order. With reference to FIG. 2, this information may be recorded as path information 38 within the relaying packet 30. The path information 38 may be used during the circulation of the relaying packet 30 to, for example, make routing decisions for the packet 30. As will be described in greater detail, under some circumstances, the path information 38 may be removed from the relaying packet 30. It should be understood that the relaying packet 30 of FIG. 2 is merely an example of one possible packet configuration that may be used in accordance with the present invention. Many other relaying packet formats may alternatively be used.

In at least one embodiment of the present invention, one or more of the wireless nodes within a wireless mesh network may be programmed to issue a new relaying packet if a predetermined amount of time has elapsed since a relaying packet has been received by the node. This may be done, for example, to ensure that a relaying packet is always circulating. When a new relaying packet is issued, the issuing node may insert its identifier (e.g., its address) into the new relaying packet as the issuer identifier. The global serial number of the new relaying packet may be set to the current serial number plus one. Using this approach, a situation might arise where multiple relaying packets are circulating within a mesh network at the same time. This situation should be avoided. In at least one embodiment of the present invention, the issuer identifier 32 and the global serial number 34 within the relaying packets of a mesh network may be used to prevent or terminate the existence of multiple relaying packets within the network.

In one approach, each node within a mesh network will record the issuer ID and global serial number of the first relaying packet it receives. Each subsequent time that the node receives a relaying packet, the node will compare the received packet's information to the recorded issuer ID and global serial number. If the serial number of the received packet is greater than the recorded serial number, the node will record the new packet's issuer ID and global serial number and forward the new packet. If the serial number of the received packet is less than the recorded serial number, the node will discard the newly received packet. If the serial numbers are equal, then the node will compare the issuer ID of the received relaying packet to the stored issuer ID. If the issuer ID of the received packet is smaller than the recorded issuer ID, then the node will record the issuer ID and the global serial number of the newly received packet and forward the new packet. Otherwise, the node will discard the received relaying packet. This will prevent a situation where two relaying packets are circulating that were given the same serial numbers by different nodes.

In at least one embodiment of the present invention, a distributed routing technique is used to route the relaying packet through the network. That is, each node that receives the relaying packet will make a decision as to which node will next receive the packet, based on predetermined rules. In one approach, the distributed routing technique will eventually converge to a single path through the nodes of the mesh network that may minimize the amount of time required for the relaying packet to traverse the network. If one or more changes occur within the network (e.g., one or more nodes are added or removed), however, corresponding changes must be made in the routing path, even if convergence has already occurred. These path changes may occur automatically. In at least one embodiment, when a node receives the relaying packet, the node chooses a next node to receive the packet by determining which of its neighbor nodes has received the relaying packet least recently. If a new node has been added to the mesh network since the last time that the relaying packet was received by the present node, and the new node is a neighbor of the present node, then the present node will select the new node as the next node. If two neighbor nodes are tied as "least most recent" recipients (e.g., two newly added nodes), then a random selection amongst the tied nodes may be made. If a receiving node only has one neighbor node, the receiving node may send the relaying packet back to the node from which it was received. If the above rules are followed, the relaying packet will eventually converge to a single repeating path. In one approach, the path is considered to have converged if the same path is repeated two or more times in the path record. This approach will often result in a path that minimizes or nearly minimizes the time it takes for the relaying packet to traverse the entire mesh network.

Figure 3:
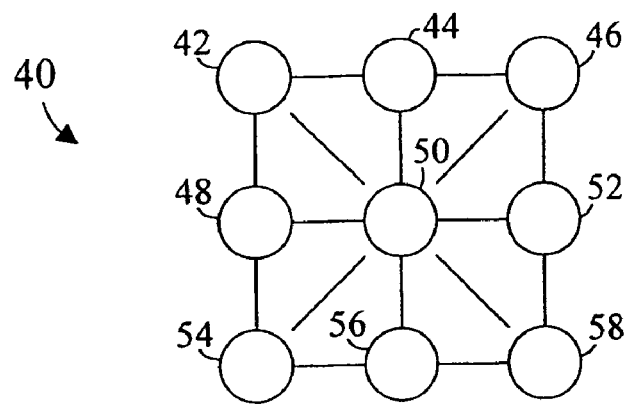
FIGS. 3, 4, and 5 are diagrams of an example mesh network that illustrate the operation of a distributed packet routing approach in accordance with an embodiment of the present invention.
Figure 4:
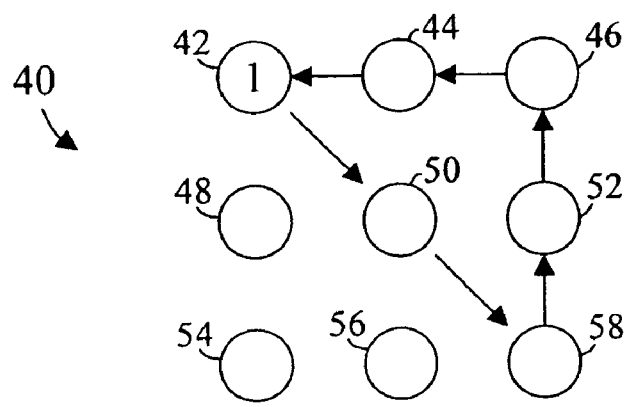
Figure 5:
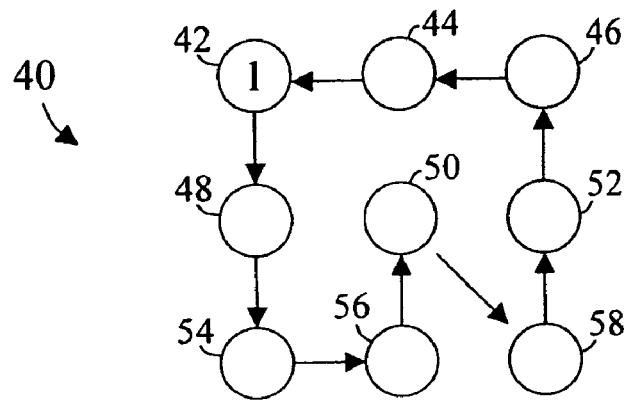

FIGS. 3, 4, and 5 are diagrams of an example mesh network 40 that illustrate the operation of the above-described distributed packet routing approach. As shown in FIG. 3, the example mesh network 40 includes nine wireless nodes 42, 44, 46, 48, 50, 52, 54, 56, 58. Each of the nodes 42, 44, 46, 48, 50, 52, 54, 56, 58 is connected by wireless link to at least one neighbor node. These wireless links are represented in FIG. 3 by straight lines between corresponding nodes. In FIG. 3, a relaying packet has not yet begun to flow in the mesh network 40. Eventually, one of the nodes 42, 44, 46, 48, 50, 52, 54, 56, 58 in the mesh network 40 may decide to issue a relaying packet. As described above, in one possible approach, one or more of the nodes 42, 44, 46, 48, 50, 52, 54, 56, 58 may be programmed to issue a relaying packet when a predetermined amount of time has passed without receiving a relaying packet in the node. Other initiation techniques may alternatively be used.

As shown in FIG. 4, node 42 initiates the circulation of a relaying packet. This is represented in FIGS. 4 and 5 by a "1" within node 42. As none of the neighbor nodes of node 42

(i.e., node 44, node 48, and node 50) have yet received a relaying packet, one of the three neighbor nodes (i.e., node 50) is selected randomly to receive the new relaying packet. Node 42 then adds node 50 to the path information within the relaying packet and transmits the packet to node 50. This process is then repeated at node 50 and each successive node (i.e., nodes 58, 52, 46, 44) until the relaying packet eventually makes it back to node 42. At this time, the neighbor node of node 42 that has been visited least recently is node 48 (which has not yet been visited) and node 48 is thus selected as the next node. Referring now to FIG. 5, the relaying packet is next directed from node 48 to node 54, and then from node 54 to node 56. At node 56, the neighbor node that the relaying packet has visited least recently is node 50. At node 50, the neighbor node that the relaying packet has visited least recently is node 58, and so on. From this point on, if no nodes are added or removed from the network, the path will remain the same.

After the same path has repeated in the path information portion of the relaying packet a predetermined number of times (e.g., two times in one embodiment), the routing process will be considered to have converged. When one of the nodes detects that the routing has converged, that node may cease to write to the path information portion of the relaying packet. Instead, the node may record the path to a local memory associated with the node. After all of the nodes in the mesh network have recorded the path locally, the path information may be deleted from the relaying packet to reduce network overhead. The deletion may be performed by a node that has already recorded the path locally and notices, on a subsequent receipt of the relaying packet, that the recorded path has not changed within the packet. If a new node is added to the mesh network, or an old node is removed, recording of path information to the relaying packet may once again be resumed.

Figure 6:
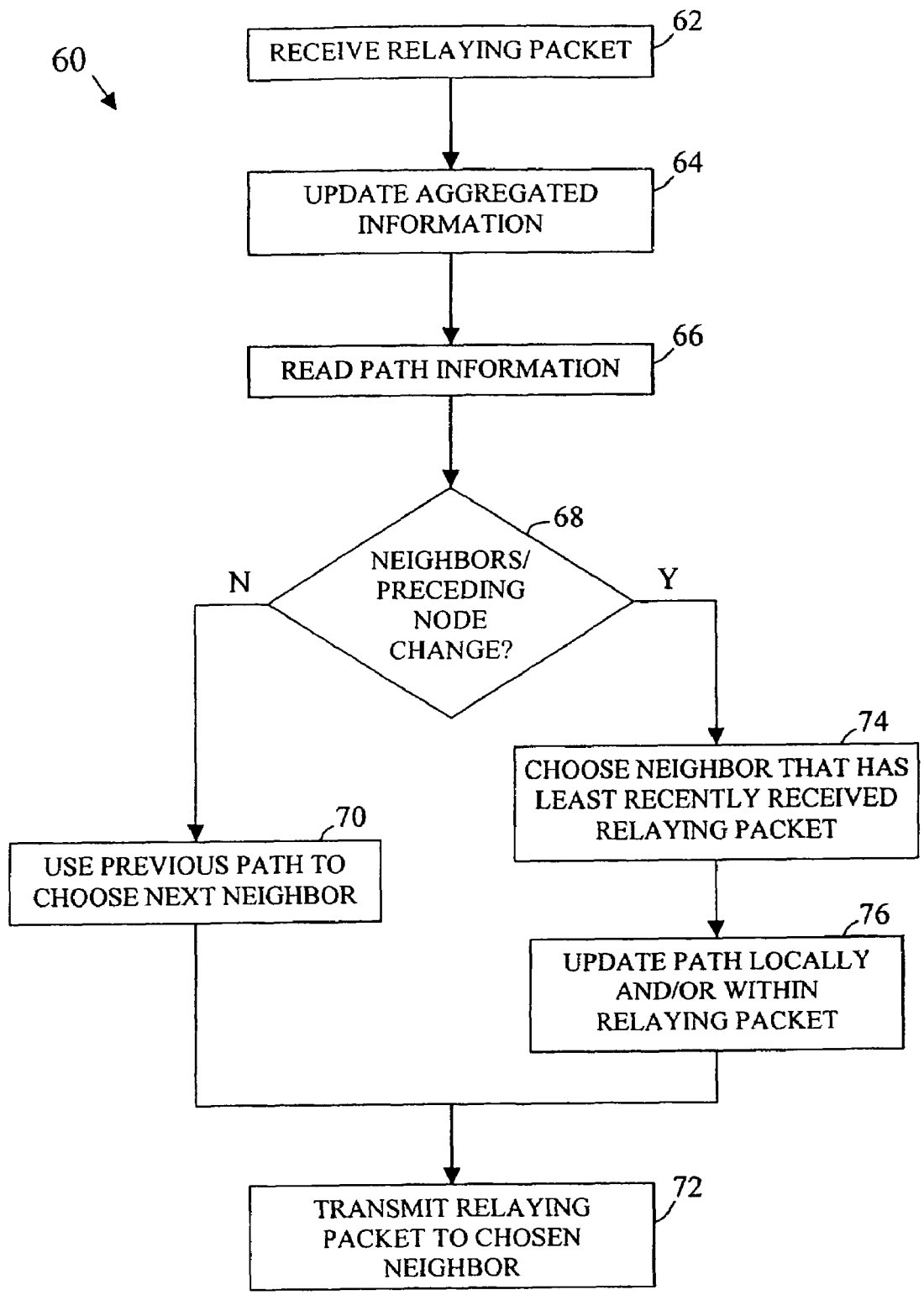
FIG. 6 is a flowchart illustrating an example method for processing a relaying packet within a node of a wireless mesh network in accordance with an embodiment of the present invention.

FIG. 6 is a flowchart illustrating an example method 60 for processing a relaying packet within a node of a wireless mesh network in accordance with an embodiment of the present invention. First, the relaying packet is received by the node (block 62). The node updates, if necessary, the aggregated information within the packet that relates to the node (block 64). The node may also use the aggregated information from the packet at this time to perform its intended function(s) (or store it for later use). As described previously, the type of aggregated information within the relaying packet will depend upon the intended application. The node may then read the path information from either the relaying packet or the local memory (block 66). It may next be determined (1) whether the node that just transmitted the relaying packet to the subject node is the same node that previously transmitted the relaying packet to the subject node (i.e., the last time the subject node received the relaying packet) and (2) whether the neighbors of the subject node have changed since the last time the subject node received the relaying packet (block 68). To determine whether preceding node has changed, the subject node may consult the path information. To determine whether the neighbor nodes have changed, the subject node may compare the present set of neighbor nodes to a set stored when the relaying packet was last received.

When neither the neighbors nor the preceding node have changed (block 68-N), the subject node will select a next node based on the stored path information (block 70). The subject node may then transmit the relaying packet to the selected neighbor node (block 72). If either the neighbors or the preceding node have changed (block 68-Y), then the subject node will select a next node to receive the relaying packet by identifying a neighbor node that has least recently received the relaying packet (block 74). This node may be identified by first identifying the neighbor nodes of the subject node and then comparing them to the stored path information to see which of the neighbor nodes appears least recently. After the next node has been selected, the path information may be updated locally and/or within the relaying packet (block 76). If the recording of path information within the relaying packet had previously ceased (e.g., because the routing process had converged), then such recording may be resumed at this point. The subject node will subsequently transmit the relaying packet to the selected neighbor node (block 72).

Figure 7:
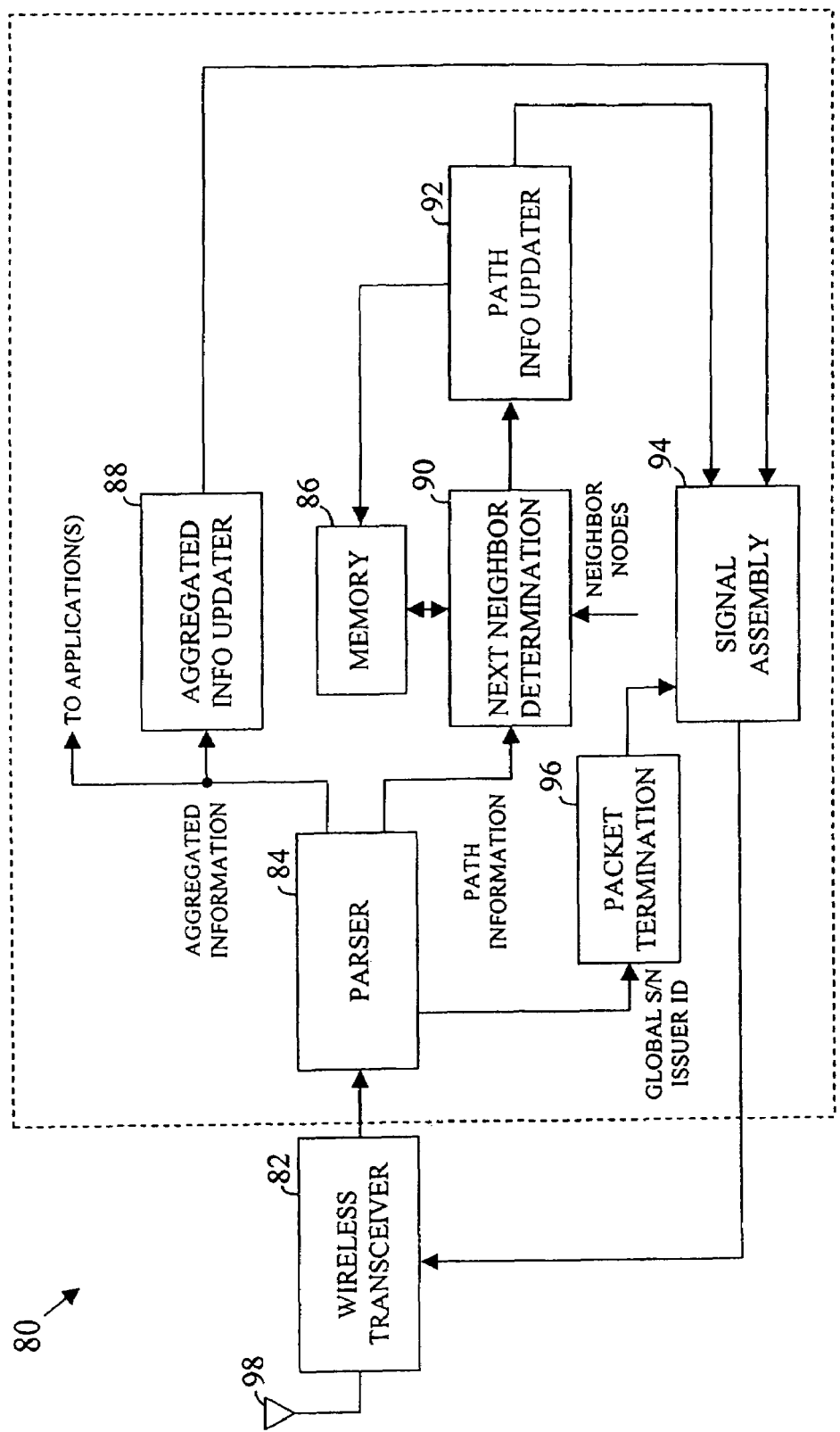
FIG. 7 is a block diagram illustrating functionality within an example wireless node device in accordance with an embodiment of the present invention.

FIG. 7 is a block diagram illustrating functionality within an example wireless node device 80 in accordance with an embodiment of the present invention. As shown, the wireless node device 80 may include one or more of: a wireless transceiver 82, a parser 84, a local memory 86, an aggregated information updater 88, a next neighbor determination unit 90, a path information updater 92, a signal assembly unit 94, and a packet termination unit 96. Other functionality may also be present within the wireless node device. The wireless transceiver 82 is operative for supporting a wireless link with one or more remote wireless entities (e.g., with neighbor node devices within a wireless mesh network). The wireless transceiver 82 may be coupled to one or more antennas 98 to facilitate the transmission and reception of wireless signals. Any type of antenna(s) may be used including, for example, a dipole, a patch, a helical antenna, an antenna array, and/or others, including combinations of the above.

During operation of the node device 80, the wireless transceiver 82 may receive a relaying packet that is circulating within a corresponding mesh network. The wireless transceiver 82 may transfer the received relaying packet to the parser 84 which parses the signal to separate various portions thereof. The aggregated information from the relaying packet may be directed to the corresponding application (or applications) for which the information is intended (e.g., a channel selection application, etc.) or to storage for later use. The aggregated information may also be directed to the aggregated information updater 88 to be updated. If this is the first time the node device 80 has received the relaying packet, the aggregated information updater 88 will add the appropriate information to the aggregated information for the node device 80.

If the node device 80 had received the relaying packet in the past, the aggregated information updater 88 will update the portion of the aggregated information that corresponds to the node device 80 (if needed). The aggregated information may then be directed to the signal assembly unit 94.

The parser 84 may deliver the path information from the relaying packet, if any, to the next neighbor determination unit 90 for use in determining a next node to receive the relaying packet. The next neighbor determination unit 90 may also receive information identifying the current neighbor nodes of the node device 80 at an input thereof. As described above, in some cases, the path information may not be located within the relaying packet. In these situations the next neighbor determination unit may consult the local memory 86 for the path information. Any type of memory or storage device may be used for the local memory 86 (e.g., one or more semiconductor memories, one or more disk drives, etc.). The next neighbor determination unit 90 may first determine whether the node that just transmitted the relaying packet to the node device 80 is the same node that transmitted the relaying packet to the node device 80 the last time the packet was received. This determination may be made by analyzing the stored path information. The next neighbor determination unit 90 may also compare a list of the present neighbor nodes of the node device 80 to a list of the neighbor nodes that were present the last time the relaying packet was received (which may, for example, be stored in the memory 86). If the neighbor nodes have not changed and the preceding node is the same, the next neighbor determination unit 90 may choose the same next node that was used previously by the node device 80 (as indicated in the path information). If one or more of the neighbor nodes have changed, or the preceding node is different, the next neighbor determination unit 90 evaluates the present neighbor nodes to identify the neighbor node that has least recently received the relaying packet. That node will then be selected as the next node. If there is only one neighbor node, then the next neighbor determination unit 90 will select that node as the next node.

After the next node has been selected, the path information and the identity of the selected next node may be delivered to the path information updater 92 which will update the path information. The path information updater 92 may also (or alternatively) update the path information stored within the memory 86. The updated path information may then be directed to the signal assembly unit 94.

The packet termination unit 96 may be included within the node device 80 to deal with situations where multiple relaying packets are circulating within the mesh network at the same time. The packet termination unit 96 may receive the global serial number and the issuer ID of the most recently received relaying packet from the parser 84. The packet termination unit 96 may then use this information to determine whether the present relaying packet should continue to circulate within the mesh network or be terminated. In at least one embodiment, the packet termination unit 96 may compare the serial number of the recently received relaying packet to the stored serial number of a first received relaying packet. If the serial number of the present packet is greater than the recorded serial number, the packet termination unit 96 may record the new packet's issuer ID and global serial number and indicate to the signal assembly unit 94 that the present relaying packet is to be forwarded. The packet termination unit 96 may also deliver the global serial number and the issuer ID of the present relaying packet to the signal assembly unit for inclusion within the packet to be forwarded. If the serial number of the present packet is less than the recorded serial number, on the other hand, the packet termination unit 96 may instruct the signal assembly unit 94 to terminate the packet (i.e., to not forward the packet). If the serial numbers are equal, then the packet termination unit 96 may compare the issuer ID of the present relaying packet to the stored issuer ID. If the issuer ID of the present packet is smaller than the recorded issuer ID, then the packet termination unit 96 will record the issuer ID and the global serial number of the present packet and indicate to the signal assembly unit 94 that the present relaying packet is to be forwarded. Otherwise, the packet termination unit 96 may instruct the signal assembly unit 94 to terminate the packet. Other packet termination strategies may alternatively be used.

The signal assembly unit 94 is operative for reassembling the present relaying packet for delivery to the next node. The signal assembly unit 94 may take the updated aggregated information, the updated path information, the global serial number, and the issuer ID and use them to reassemble the relaying packet in an appropriate format. As discussed above, in at least one embodiment, the signal assembly unit 94 may be instructed by the packet termination unit 96 to terminate a particular packet to prevent the circulation of multiple relaying packets within the mesh network. If the writing of path information to the relaying packet has been previously ceased, then the signal assembly unit 94 will not add the updated path information to the relaying packet during reassembly. Other types of information may also (or alternatively) be added to the relaying packet. The assembled relaying packet is subsequently delivered to the wireless transceiver 82 which transmits the packet to the next node.

The techniques and structures of the present invention may be realized in any of a variety of different forms. For example, features of the invention may be embodied within any type of component, device, or system that may be used as a node within a wireless mesh network. Some such components, devices, and systems include, for example, wireless access points, cellular base stations, cellular telephones and other handheld wireless communicators, personal digital assistants having wireless capability, laptop, palmtop, and tablet computers having wireless capability, pagers, satellite communicators, cameras having wireless capability, audio/video devices having wireless capability, wireless network interface cards (NICs) and other network interface structures, integrated circuits, and/or others. Features of the invention may also be embodied as instructions and/or data structures stored on machine readable media, and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one embodiment, two or more of the blocks in a block diagram are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   receiving a relaying packet at a first wireless node in a mesh network, said relaying packet having aggregated information;

updating said aggregated information within said relaying packet;
determining a next node to which said relaying packet is to be transmitted based on path information associated with said relaying packet;
updating said path information associated with said relaying packet when a path associated with said relaying packet changes as a result of determining a next node; and
transmitting said relaying packet to said next node;
wherein determining a next node includes:
determining whether neighbor nodes of said first wireless node have changed since a last time that said first wireless node received a relaying packet;
determining whether a node that just transmitted said relaying packet to said first wireless node is different from a node that transmitted a relaying packet to said first wireless node in the past; and
choosing the same next node that was used previously by said first wireless node, as indicated in said path information, when (a) said neighbor nodes of said first wireless node have not changed since the last time that said first wireless node received a relaying packet, and (b) said node that just transmitted said relaying packet to said first wireless node is the same as the node that transmitted a relaying packet to said first wireless node in the past.

2. The method of claim 1, wherein:
said path information includes identifiers for wireless nodes that said relaying packet has visited in the past.

3. The method of claim 1, wherein:
said path information is part of said relaying packet.

4. The method of claim 1, wherein:
said path information is retrieved from a local memory associated with said first wireless node.

5. The method of claim 1, wherein:
said aggregated information includes information for use in supporting self configuration functions with said mesh network.

6. The method of claim 1, wherein:
said aggregated information includes information for use in supporting channel selection functions with said mesh network.

7. The method of claim 1, wherein:
determining a next node includes determining which neighbor node of said first wireless node has least recently received said relaying packet.

8. The method of claim 1, wherein:
determining a next node includes choosing a neighbor node of said first wireless node that has least recently received a relaying packet when at least one of the following are true: (a) said neighbor nodes of said first wireless node have changed since the last time that said first wireless node received a relaying packet, and (b) said node that just transmitted said relaying packet to said first wireless node is different from a node that transmitted a relaying packet to said first wireless node in the past.

9. An apparatus comprising:
a wireless transceiver;
an aggregated information updater to update aggregated information within a relaying packet received by said wireless transceiver;
a next neighbor determination unit to determine a next node to which said relaying packet is to be transmitted; and a path information updater to update path information associated with said relaying packet received by said wireless transceiver when changes to a packet path have been made;
wherein said next neighbor determination unit is programmed to:
determine whether neighbor nodes of said first wireless node have changed since a last time that said apparatus received a relaying packet;
determine whether a node that just transmitted said relaying packet to said apparatus is different from a node that transmitted a relaying packet to said apparatus in the past; and
choose the same next node that was used previously by said apparatus, as indicated in said path information, when (a) said neighbor nodes of said apparatus have not changed since the last time that said apparatus received a relaying packet, and (b) said node that just transmitted said relaying packet to said apparatus is the same as the node that transmitted a relaying packet to said apparatus in the past.

10. The apparatus of claim 9, wherein:
said next neighbor determination unit is programmed to determine said next node based on said path information associated with said relaying packet.

11. The apparatus of claim 10, wherein:
said path information associated with said relaying packet is within said relaying packet.

12. The apparatus of claim 10, further comprising:
said path information associated with said relaying packet is retrieved from a local memory associated with said apparatus.

13. The apparatus of claim 9, wherein:
said next neighbor determination unit is programmed to determine said next node by determining which neighbor node of said apparatus has least recently received a relaying packet.

14. The apparatus of claim 9, wherein:
said next neighbor determination unit is programmed to choose a neighbor node of said apparatus that has least recently received a relaying packet when at least one of the following are true: (a) said neighbor nodes of said apparatus have changed since the last time that said apparatus received a relaying packet, and (b) said node that just transmitted said relaying packet to said apparatus is different from a node that transmitted a relaying packet to said apparatus in the past.

15. A computer readable storage medium having instructions stored thereon that, when executed by a computing platform, operate to:
receive a relaying packet at a first wireless node in a mesh network, said relaying packet having aggregated information;
update said aggregated information within said relaying packet;
determine a next node to which said relaying packet is to be transmitted based on path information associated with said relaying packet;
update said path information associated with said relaying packet when a path associated with said relaying packet changes as a result of determining a next node; and
transmit said relaying packet to said next node;
wherein operation to determine a next node includes operation to:
determine whether neighbor nodes of said first wireless node have changed since a last time that said first wireless node received a relaying packet;

determine whether a node that just transmitted said relaying packet to said first wireless node is different from a node that transmitted a relaying packet to said first wireless node in the past; and choose the same next node that was used previously by said apparatus, as indicated in said path information, when (a) said neighbor nodes of said apparatus have not changed since the last time that said apparatus received a relaying packet, and (b) said node that just transmitted said relaying packet to said apparatus is the same as the node that transmitted a relaying packet to said apparatus in the past.

16. The computer readable storage medium of claim 15, wherein:

operation to determine a next node includes operation to determine which neighbor node of said first wireless node has least recently received said relaying packet.

17. The computer readable storage medium of claim 15, wherein:

operation to determine a next node includes operation to choose a neighbor node of said apparatus that has least recently received a relaying packet when at least one of the following are true: (a) said neighbor nodes of said apparatus have changed since the last time that said apparatus received a relaying packet, and (b) said node that just transmitted said relaying packet to said apparatus is different from a node that transmitted a relaying packet to said apparatus in the past.

18. A wireless device comprising:

at least one dipole antenna;

a wireless transceiver coupled to said at least one dipole antenna;

an aggregated information updater to update aggregated information within a relaying packet received by said wireless transceiver;

a next neighbor determination unit to determine a next node to which said relaying packet is to be transmitted; and a path information updater to update path information associated with said relaying packet received by said wireless transceiver when changes to a packet path have been made;

wherein said next neighbor determination unit is programmed to:

determine whether neighbor nodes of said first wireless node have changed since a last time that said apparatus received a relaying packet;

determine whether a node that just transmitted said relaying packet to said apparatus is different from a node that transmitted a relaying packet to said apparatus in the past; and choose the same next node that was used previously by said apparatus, as indicated in said path information, when (a) said neighbor nodes of said apparatus have not changed since the last time that said apparatus received a relaying packet, and (b) said node that just transmitted said relaying packet to said apparatus is the same as the node that transmitted a relaying packet to said apparatus in the past.

19. The wireless device of claim 18, wherein:

said next neighbor determination unit is programmed to determine said next node by determining which neighbor node of said apparatus has least recently received a relaying packet.

20. The wireless device of claim 18, wherein:

said next neighbor determination unit is programmed to choose a neighbor node of said apparatus that has least recently received a relaying packet when at least one of the following are true: (a) said neighbor nodes of said apparatus have changed since the last time that said apparatus received a relaying packet, and (b) said node that just transmitted said relaying packet to said apparatus is different from a node that transmitted a relaying packet to said apparatus in the past.

* * * * *